United States Patent
Martindale et al.

(10) Patent No.: US 7,338,250 B2
(45) Date of Patent: Mar. 4, 2008

(54) GAS TURBINE ENGINE BLADE CONTAINMENT ASSEMBLY

(75) Inventors: Ian G Martindale, Derby (GB); Sivasubramaniam K Sathianathan, Burton on Trent (GB)

(73) Assignee: Rolls-Royce plc, London (GB)

( * ) Notice: Subject to any disclaimer, the term of this patent is extended or adjusted under 35 U.S.C. 154(b) by 336 days.

(21) Appl. No.: 10/954,303

(22) Filed: Oct. 1, 2004

(65) Prior Publication Data
US 2005/0074328 A1 Apr. 7, 2005

(30) Foreign Application Priority Data
Oct. 3, 2003 (GB) .................. 0323227.9

(51) Int. Cl.
*F01B 25/16* (2006.01)
(52) U.S. Cl. ............... 415/9; 415/119; 415/173.1
(58) Field of Classification Search .......... 415/9, 415/119, 173.1, 173.4
See application file for complete search history.

(56) References Cited

U.S. PATENT DOCUMENTS

| | | | |
|---|---|---|---|
| 3,542,152 A * | 11/1970 | Oxx, Jr. et al. ........... | 181/214 |
| 4,239,452 A * | 12/1980 | Roberts, Jr. .............. | 415/173.5 |
| 4,452,335 A * | 6/1984 | Mathews et al. .......... | 181/214 |
| 5,486,086 A | 1/1996 | Bellia | |
| 6,179,551 B1 * | 1/2001 | Sathianathan et al. ...... | 415/9 |
| 6,182,787 B1 * | 2/2001 | Kraft et al. ............. | 181/292 |
| 6,619,913 B2 * | 9/2003 | Czachor et al. .......... | 415/119 |

FOREIGN PATENT DOCUMENTS

| | | |
|---|---|---|
| EP | 1344895 A | 9/2003 |
| GB | 2375798 A | 11/2002 |

* cited by examiner

*Primary Examiner*—Hoang Nguyen
(74) *Attorney, Agent, or Firm*—W. Warren Taltavull; Manelli Denison & Selter PLLC

(57) ABSTRACT

A gas turbine engine rotor blade containment assembly (38) comprises a containment casing (40) and the containment casing (40) has a plurality of axially spaced ribs (66). The ribs (66) extend circumferentially and radially inwardly from the containment casing (40) to define a plurality of circumferentially extending grooves (76) and a perforate sheet (70) is secured to the radially inner ends (68) of the ribs (66). In the arrangement of the present invention the blade containment function and the acoustic treatment function are combined.

11 Claims, 1 Drawing Sheet

GAS TURBINE ENGINE BLADE CONTAINMENT ASSEMBLY

TITLE OF THE INVENTION

1. Field of the Invention

The present invention relates to a gas turbine engine casings, particularly to a turbofan gas turbine engine fan casing, more particularly to an improved blade containment assembly for use within or forming part of the gas turbine engine casing.

2. Background of the Invention

Turbofan gas turbine engines for powering aircraft conventionally comprise a core engine, which drives a fan. The fan comprises a number of radially extending fan blades mounted on a fan rotor, which is enclosed by a generally cylindrical, or frustoconical, fan casing. The core engine comprises one or more turbines, each one of which comprises a number of radially extending turbine blades enclosed by a cylindrical, or frustoconical, casing.

There is a remote possibility with such engines that part, or all, of a fan blade, or a turbine blade, could become detached from the remainder of the fan or turbine. In the case of a fan blade becoming detached this may occur as the result of, for example, the turbofan gas turbine engine ingesting a bird or other foreign object.

The use of containment rings for turbofan gas engine casings is well known. It is known to provide generally cylindrical, or frustoconical, relatively thick metallic containment rings. It is also known to provide generally cylindrical, or frustoconical, locally thickened, isogrid, metallic containment rings. It is also known to provide strong fibrous material wound around relatively thin metallic casings or around the above-mentioned containment casings. In the event that a blade becomes detached it passes through the casing and is contained by the fibrous material.

The use of acoustic treatment for turbofan gas turbine engine casings is well known. It is known to provide metallic, or composite, honeycomb structures with a perforate facing sheet to form an acoustic liner within the gas turbine engine casing. The acoustic liner generally comprises a plurality of separate panels, which are adhesively bonded, or otherwise secured to the gas turbine engine casing.

SUMMARY OF THE INVENTION

Accordingly the present invention seeks to provide a novel gas turbine engine casing, which combines the function of blade containment and acoustic treatment.

Accordingly the present invention provides a gas turbine engine rotor blade containment assembly comprising a containment casing, the containment casing having a plurality of axially spaced ribs, the ribs extending circumferentially and radially inwardly from the containment casing to define a plurality of circumferentially extending grooves and a perforate sheet secured to the radially inner ends of the ribs.

The ribs absorb the energy of a foreign object by bending and fracture before the foreign object reaches the containment casing and the grooves and perforate sheet absorb noise.

Preferably at least one axially extending member is arranged between each pair of axially adjacent ribs.

The ribs may have a uniform thickness in a radial direction or the ribs may decrease in thickness in a radially inward direction.

Preferably the ribs are integral with the containment casing.

Preferably the perforate sheet is brazed, diffusion bonded or adhesively bonded to the ribs.

The containment casing may comprise an upstream portion, a blade containment portion and a downstream portion, the blade containment portion being arranged downstream of the upstream portion and upstream of the downstream portion, the ribs may be arranged on the downstream portion of the containment casing.

The containment casing may be cylindrical or frustoconical.

The containment casing may comprise a metal.

The metal may comprise titanium, a titanium alloy, steel, aluminium, an aluminium alloy, nickel or a nickel alloy.

The containment casing may be a fan containment casing.

BRIEF DESCRIPTION OF THE DRAWING

The present invention will be more fully described by way of example with reference to the accompanying drawings in which:—

DETAILED DESCRIPTION OF THE INVENTION

Figure 1:
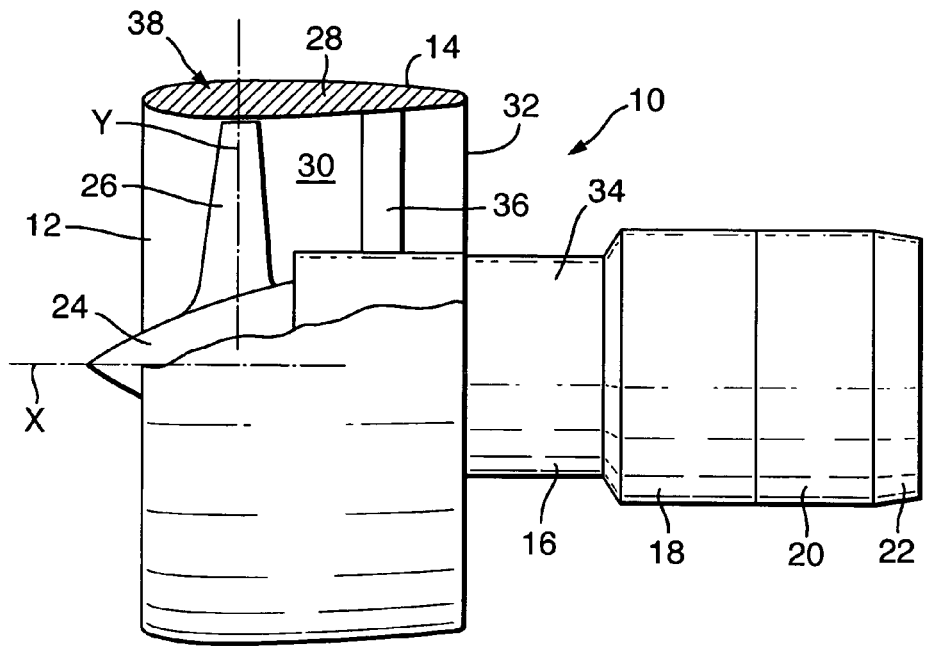
FIG. 1 is a partially cut away view of a gas turbine engine having a fan blade containment assembly according to the present invention.

A turbofan gas turbine engine 10, as shown in FIG. 1, comprises in flow series an intake 12, a fan section 14, a compressor section 16, a combustion section 18, a turbine section 20 and an exhaust 22. The turbine section 20 comprises one or more turbines (not shown) arranged to drive one or more compressors (not shown) in the compressor section 16 via shafts (not shown). The turbine section 20 also comprises one or more turbines (not shown) arranged to drive the fan section 14 via a shaft (not shown). The turbofan gas turbine engine 10 operates quite conventionally and its operation will not be discussed further.

The fan section 14 comprises a fan rotor 24, which carries a plurality of circumferentially spaced radially outwardly extending fan blades 26. The fan rotor 24 and fan blades 26 are surrounded by a fan casing 28, which is arranged substantially coaxially with the fan rotor 24 and fan blades 26. The fan casing 28 partially defines a fan duct 30 and the fan duct 30 has an outlet 32 at its axially downstream end. The fan casing 28 is secured to a core engine casing 34 by a plurality of radially extending fan outlet guide vanes 36, which are secured to the fan casing 30 and the core engine casing 34. The fan rotor 24 and fan blades 26 rotate about an axis X of the turbofan gas turbine engine 10, substantially in a plane Y perpendicular to the axis X. The fan casing 28 also comprises a fan blade containment assembly 38, which is arranged substantially in the plane Y of the fan blades 26.

Figure 2:
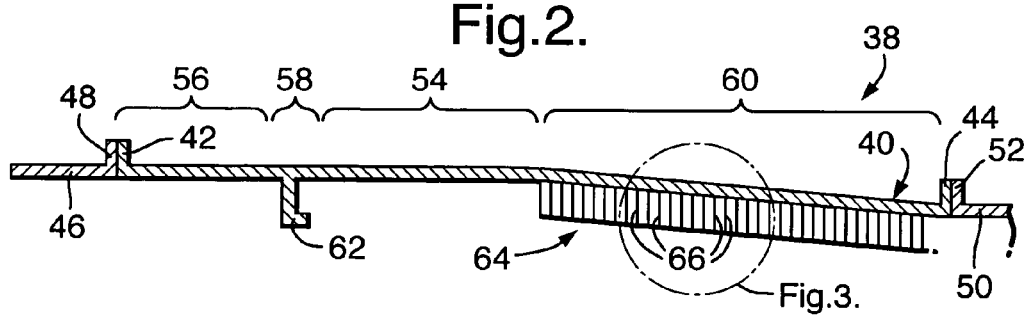
FIG. 2 is an enlarged cross-sectional view of the fan blade containment assembly shown in FIG. 1.
Figure 3:
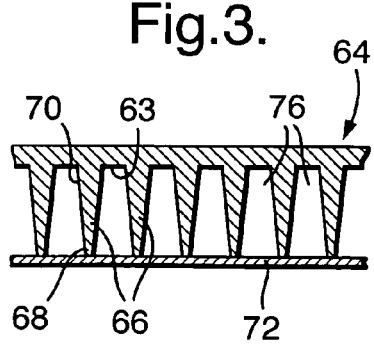
FIG. 3 is a further enlarged cross-sectional view of part of the fan blade containment assembly shown in FIG. 2.
Figure 4:
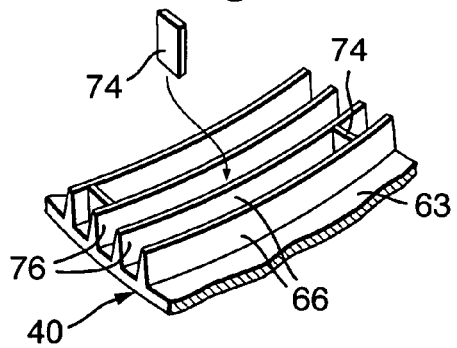
FIG. 4 is a perspective view of part of the fan blade containment assembly shown in FIG. 3.

The fan casing 28 and the fan blade containment assembly 38 is shown more clearly in FIGS. 2 to 4. The fan blade containment assembly 38 comprises a metal cylindrical, or frustoconical, casing 40. The metal casing 40 comprises an upstream flange 42 by which the fan blade containment assembly 38 is connected to a flange 48 on an intake assembly 46 of the fan casing 28. The metal casing 40 also comprises a downstream flange 44 by which the fan blade containment assembly 38 is connected to a flange 52 on a rear portion 50 of the fan casing 28.

The metal casing 40 provides the basic fan blade containment and provides a connection between the intake assembly 46 and the rear portion 50 of the fan casing 28.

The metal casing 40 comprises an upstream portion 56, a transition portion 58, a main blade containment portion 54 and a downstream portion 60. The upstream portion 56 comprises the flange 42 and the downstream portion 60 comprises the flange 44.

The upstream portion 56 is upstream of the plane Y of the fan blades 26 and provides debris protection for the fan blade containment assembly 38. The main blade containment portion 54 is substantially in the plane Y containing the fan blades 26 and comprises a radially inwardly and axially downstream extending flange, or hook, 62 at its upstream end.

The transition portion 58 connects the main blade containment portion 54 and the upstream portion 56 to transmit loads from the main blade containment portion 54 to the upstream flange 42 on the upstream portion 56. The downstream portion 60 is downstream of the plane Y of the fan blades 26, and provides protection for where a root of a fan blade 26 impacts the fan blade containment assembly 38.

The downstream portion 60 comprises an impact protection means 64 arranged coaxially with and abutting the inner surface 63 of the downstream portion 60. The impact protection means 64 is located in the region of the downstream portion 60 between the main blade containment portion 54 and the fan outlet guide vanes 36.

The impact protection means 64 comprises a plurality of ribs 66, which extend radially inwardly from and circumferentially around the inner surface 63 of the downstream portion 60. The ribs 66 are preferably integral with the downstream portion 60 and are machined from the downstream portion 60. The ribs 66 are tapered such that they increase in thickness from their radially inner ends 68 to their radially outer ends 70. However, it may be possible for the ribs 66 to have a uniform thickness from their radially inner ends 68 to their radially outer ends 70. A perforate sheet 72 is bonded to the radially inner ends 68 of the ribs 66. The perforate sheet 72 partially defines the outer surface of the fan duct 30. The perforate sheet 72 is bonded to the radially inner ends 68 of the ribs 66 by an adhesive bond, a diffusion bond or brazed bond. One or more members 74 are provided between each pair of adjacent ribs 66 to divide the circumferentially extending grooves 76 defined between adjacent ribs 66.

In operation the ribs 66 of the impact protection means 64 act as a spacer between the radially inner portion, the root, of the fan blade 26 and the downstream portion 60 of the metal casing 40 to reduce the damage to the downstream portion 60 and to prevent it penetrating through the downstream portion 60. The ribs 66 prevent the inner portion of the fan blade 26 contacting the downstream portion 60 of the metal casing 40 and prevents the sharp corners, or edges, of the inner portion of the fan blade 26 cutting through the downstream portion 60 of the metal casing 40. The ribs 66 absorb the energy of the inner portion of the fan blade 26 by bending and fracture of the ribs 66 before the inner portion of the fan blade 26 reaches the downstream portion 60.

Also the perforate sheet 72 together with the grooves 76, defined between the ribs 66, form an acoustic treatment to absorb noise. The absence of individual cells does not greatly affect the acoustic performance of the acoustic treatment as long as the ribs 66 provide a barrier to reduce, or prevent, noise travelling axially upstream and downstream of the metal casing 40. If necessary, widely circumferentially spaced members 74 are placed between the ribs 66 to reduce, or prevent, noise travelling circumferentially within the grooves 76 around the downstream portion 60 of the metal casing 40.

The advantages of the present invention are that the rotor blade containment assembly combines the rotor blade containment function and the acoustic treatment function. The rotor blade containment assembly is a lightweight assembly compared to the use of a separate blade containment assembly and acoustic treatment assembly. Also there is a reduction in cost due to a simpler construction. Furthermore, in the arrangement with a separate rotor blade containment assembly and acoustic treatment assembly there are two bonds, one between the acoustic treatment assembly and the rotor blade containment assembly and one between the honeycomb structure and perforate sheet of the acoustic treatment assembly, whereas in the present invention there is only a single bond between the ribs and the perforate sheet. This reduces the requirement for ultrasonic inspection of bonds from two to one.

The metal casing may be manufactured from any suitable metal or metal alloy. Preferably the metal casing comprises a steel alloy, aluminium, an aluminium alloy, magnesium, a magnesium alloy, titanium, a titanium alloy, nickel or a nickel alloy.

The main blade containment portion may also comprise one or more integral T section ribs, which extend radially outwardly from the main blade containment portion. The T section ribs extend circumferentially around the main blade containment portion to stiffen the metal casing to improve the fan blade containment properties.

Alternatively it may be possible to provide a strong fibrous material wound around the main blade containment portion of the metal casing. In the event that a blade becomes detached it passes through the metal casing and is contained by the fibrous material.

Although the present invention has been described with reference to a metal casing it may be possible it use the invention on other types of casing.

We claim:

1. A gas turbine engine rotor blade containment assembly comprising a containment casing, the containment casing providing basic blade containment and having impact protection means radially inwardly therefrom, the impact protection means comprising a plurality of axially spaced tapered ribs secured thereto, all the ribs extending circumferentially and radially inwardly from the containment casing to define a plurality of circumferentially extending grooves and a perforate sheet secured to the radially inner ends of all the ribs, such that the perforate sheet and grooves defined between the ribs form an acoustic treatment.

2. A gas turbine engine rotor blade containment assembly as claimed in claim 1 wherein at least one axially extending member is arranged between each pair of axially adjacent ribs.

3. A gas turbine engine rotor blade containment assembly as claimed in claim 1 wherein the ribs have radially inner ends and radially outer ends, the ribs have a uniform thickness from their radially inner ends to their radially outer ends.

4. A gas turbine engine rotor blade containment assembly as claimed in claim 1 wherein the ribs have radially inner ends and radially outer ends, the ribs decrease in thickness from their outer ends to their radially inner ends.

5. A gas turbine engine rotor blade containment assembly as claimed in claim 1, wherein the ribs are integral with the containment casing.

6. A gas turbine engine rotor blade containment assembly as claimed in claim 1 wherein the perforate sheet is secured to the radially inner ends of the ribs by securing means selected from the group comprising a brazed bond, a diffusion bond and an adhesive bond.

7. A gas turbine engine rotor blade containment assembly as claimed in claim 1 wherein the containment casing comprises an upstream portion, a blade containment portion and a downstream portion, the blade containment portion being arranged downstream of the upstream portion and upstream of the downstream portion, the ribs are arranged on the downstream portion of the containment casing.

8. A gas turbine engine rotor blade containment assembly as claimed in claim 1 wherein the containment casing is selected from the group comprising a casing and a frusto-conical casing.

9. A gas turbine engine rotor blade containment assembly as claimed in claim 1 wherein the containment casing comprises a metal.

10. A gas turbine engine rotor blade containment assembly as claimed in claim 9 wherein the metal is selected from the group comprising titanium, a titanium alloy, steel, aluminium, an aluminium alloy, nickel and a nickel alloy.

11. A gas turbine engine rotor blade containment assembly as claimed in claim 1 wherein the containment casing is a fan containment casing.

* * * * *